United States Patent Office 3,228,089
Patented Jan. 11, 1966

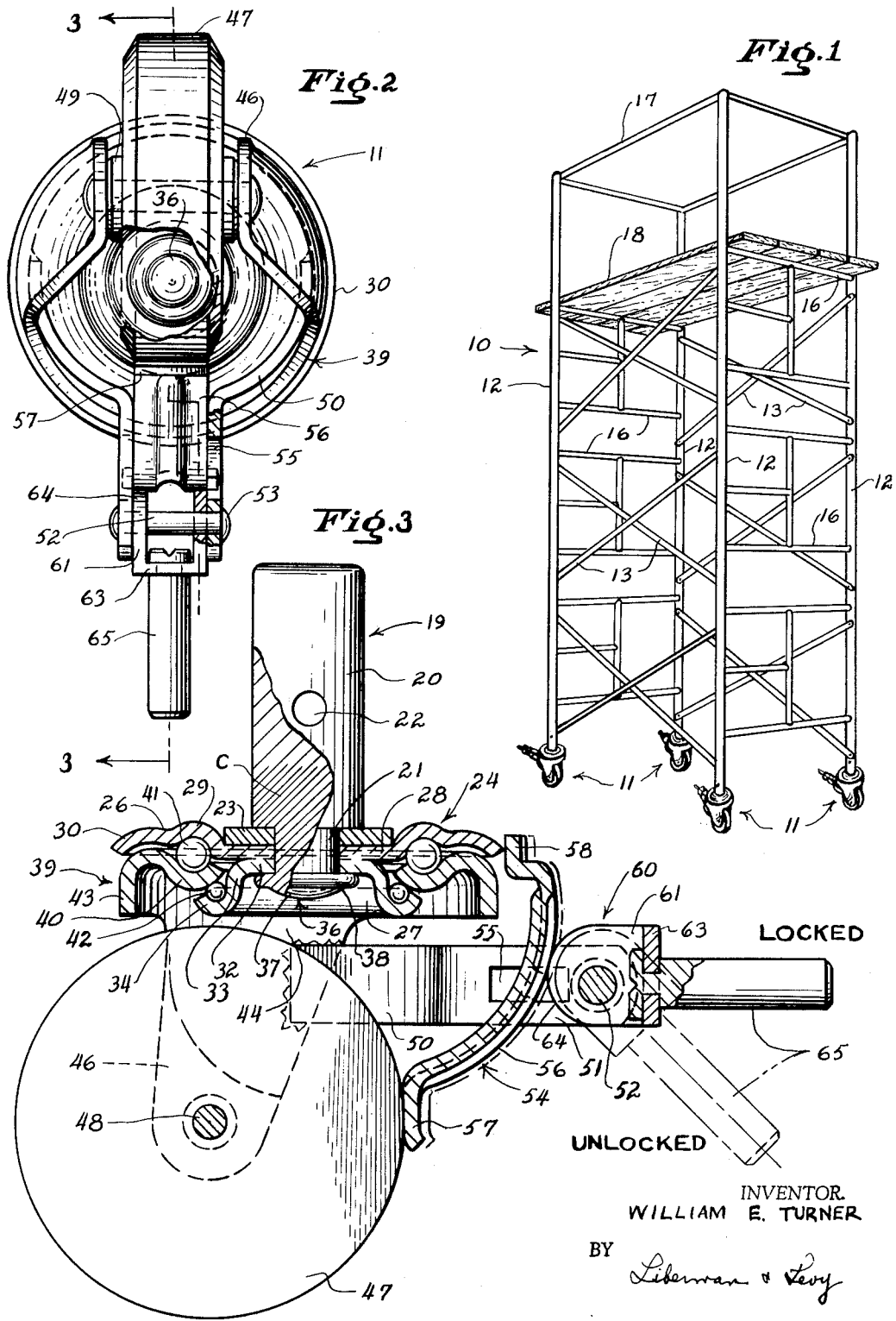

3,228,089
METHOD OF MAKING A CASTER DEVICE
William E. Turner, Rome, Ga., assignor to Fairbanks Company, New York, N.Y., a corporation of New Jersey
Filed Feb. 11, 1964, Ser. No. 344,063
3 Claims. (Cl. 29—148.4)

The present invention relates generally to improvements in wheeled structures, and it relates particularly to an improved caster device and to a method of producing the same.

It is a common practice to support many types of structures, machines, and other devices on wheels to facilitate the transportation and movement thereof. Some of these devices, such as scaffolds, many types of hand trucks, racks and the like employ casters or wheels mounted in swivel brackets or frames to permit the easy universal movement of these devices along a support surface. While the conventional caster and those swivelled wheel devices heretofore employed are generally satisfactory for many uses, they possess numerous drawbacks and disadvantages and are unsuitable for many applications, particularly under heavy loading conditions. For example, in caster mounted scaffolds or platforms which are often required to support heavy loads, failure of the caster device is frequently experienced with the attendant danger or consequent upsetting of the platform or scaffold. In the conventional caster, the wheel bracket and the caster coupling or mounting member are generally assembled by means of a rivet in which the head is cold upset or swaged to effect the locking of the assembly, thereby necessitating the use of a ductile steel or the like. It has been found that the failure of the caster device under heavy loading is caused by the pulling of the rivet, the failure of a weak section of the mounting member or other reason consequent to the aforesaid assembly system.

It is therefore a principal object of the present invention to provide an improved wheeled device and method of producing the same.

Another object of the present invention is to provide an improved swiveled wheel device or caster and a method of producing the same.

Still another object of the present invention is to provide an improved caster of great strength, ruggedness and reliability.

A further object of the present invention is to provide an improved method of assembling a caster of the above nature characterized by its simplicity and ease of control.

The above and other objects of the present invention will become apparent from a reading of the following description taken in conjunction with the accompanying drawing, wherein:

FIG. 1 is a perspective view of a scaffold structure employing casters embodying the present invention;

FIG. 2 is a bottom plan view of the improved caster with portions broken away to reveal inner constructional detail; and FIG. 3 is a sectional view taken along line 3—3 of FIG. 2.

In a sense the present invention contemplates the provision of a caster device comprising a mounting member including an upper section and an integrally formed depending shank of reduced transverse cross section, a bracket rotatably registering with said shank, means including a forged head integrally formed at the bottom of and of greater transverse cross section than said shank and locking said bracket or wheel bearing and support assembly to said mounting member, and a wheel mounted on said bracket. The caster device is assembled by positioning a coupling aperture formed in the bracket into engagement with the shank, heating the shank to its forging temperature and applying axial pressure to the end of the heated shank to spread it into the shape of an enlarged head engaging the underface of the coupling member.

According to a preferred form of the improved caster there are provided upper and lower race members having vertically spaced downwardly and upwardly directed races respectively and provided with inner superimposed sections secured to each other and having aligned axial openings. The wheel bracket includes an annular top plate having an upwardly directed intermediate race along its inner periphery confronting the top race. Ball bearings register with and are entrapped between the top and intermediate races, and with the bottom race in which they are confined by the underface of the intermediate race. The aligned openings in the top and bottom race members engage the shank which is delineated from the upper section member by a peripheral shoulder and these race members are locked in rigid assembly with the mounting member by the forged head of the radially expanded shank. In effecting the rigid high strength assembly of the wheel bracket bearing and the mounting member, the shank is inserted into registry with the bearing aperture and is rapidly raised to its forging temperature by the high current resistance heating thereof which substantially confines the high temperature to the shank and the adjacent area of the mounting member integral therewith, causing said portions to become case hardened. The current is applied by means of axially spaced electrodes, engaging the mounting member and urged toward each other, the electrode engaging the end face of the shank being preferably cupped to complement the outer face of the forged head.

Referring now to the drawing which illustrates a preferred embodiment of the present invention the reference numeral 10 generally designates a scaffold structure provided with the improved casters 11, it being understood that the casters may be applied to any other desired structure or device, for example platforms, towers, stands, trucks, racks and the like. The scaffold 10 is formed of tubular metal structural members, including front and rear pairs of laterally spaced columns 12, the front columns as well as the rear columns being connected by crossing angularly extending struts 13 and the columns of each pair being interconnected along their lengths by frame structures including suitably reinforced horizontal cross members 16. Extending between the upper ends of the columns 12 are hand rails 17 delineating a protective enclosure, and planks 18 extend across the top cross members 16 to define a platform. A caster 11 is mounted at the bottom of each of the columns 12.

Each of the casters 11 comprises a coupling or mounting member 19 formed of a forgeable, high carbon, advantageously case hardened steel and includes a cylindrical upper section or stem 20 of a diameter approximately that of the inside of the tubular columns 12 and a depending integrally formed coaxial shank or pin 21 of reduced transverse cross section delineated from the stem 20 by a horizontal peripheral shoulder. The stem 20 engages the bottom axial opening of a corresponding column 12 and is locked thereto by any suitable fastening member engaging a transverse bore 22 formed in the stem 20 and aligned apertures formed in the column 12. A hardened collar or washer 23 registers with the shank 21 and abuts the shoulder at the underface of the stem 20.

A bearing assembly 24 is provided with a central aperture which engages the shank 21 and underlies the collar 23, the bearing assembly comprising an upper race member 26 and a lower race bearing member 27. The upper race member 26 includes a central flat annular section 28 substantially coextensive with and abutting the underface of the collar 23 and provided with an outwardly upwardly extending peripheral channel 29 defining a downwardly directed race and terminating in a downwardly concave border section 30. The lower race member 27 is substantially cup shaped including a centrally apertured upper flat circular web 32 underlying the annular section 28 and advantageously directly affixed thereto such as by welding. Depending from the edge of the web 32 is a skirt 33 terminating in an outwardly projecting annular channel section 34 defining an upwardly directed race disposed below and inwardly of the race 29.

The race members 26 and 27 are rigidly locked to the shank 21 and affixed to the mounting member 19 by an upset forged head 36 integrally formed at the lower end of the shank 21 and including a central crowned portion 37 and a peripheral section 38. The top face of the peripheral section 38 bears on the underface of the web 32 to firmly entrap the race member sections 28 and 32 and the collar 23 between the head 36 and the under shoulder of the stem 20. Furthermore, the shank 21 is radially expanded into tight pressure engagement with the inner peripheral faces of the collar 23 and race members 26 and 27.

A wheel bracket 39 is rotatably associated with the race members 26 and 27 and comprises an annular channel 40 defining an upwardly directed intermediate race confronting and registering with the upper race 29. A set of ball bearings 41 are entrapped between and engaged by the confronting upper and intermediate races 29 and 40. The inner under face of the channel section 40 confronts the lower race 34 and confines a set of ball bearings 42 therein. Thus the bracket 39 freely swivels about the vertical axis of the mounting member 19 even under heavy loads.

Depending from the outer periphery of the channel section 40 is a skirt 43, opposite sides of which are provided with downwardly directed curved sections 44 terminating in inwardly offset transversely spaced parallel arms 46. A wheel 47, preferably of the rubber tire type, is freely rotatably journalled to and between the lower parts of the arms 46 by means of an axle 48 engaging the hub 49 of the wheel 47 and mounted between the arms 46.

A horizontal yoke member is directed rearwardly from the wheel bracket 39 and includes a pair of confronting curved legs 50 whose inner ends are secured to the inner faces of the bracket sections 44 and whose outer ends converge to a pair of laterally spaced parallel legs 51. A transverse pivot pin 52 extends between the free ends of the legs 51 and is affixed thereto by the enlarged heads 63 at the ends of the pivot pin 52. A vertically extending brake member 54 is supported between the legs 51 and comprises a curved member 56 provided with transversely oppositely directed lugs which slidably engage corresponding longitudinal slots 55 formed in the legs 51. Depending from the lower end of the curved member 56 is a brake shoe section 57 confronting the peripheral surface of the wheel 47. A vertical brake shoe section 58 is supported at the upper end of the curved member 56 by an inwardly directed arm 59 and confronts the periphery of the upper race member 26.

The brake member 54 is selectively movable between a locked braking position and a retracted release position by a U-shaped cam member 60 rockably supported between the trailing ends of the arms 51 and including a pair of transversely spaced legs 61 joined at their trailing edges by a cross web 63. The legs 61 have an aligned pair of apertures formed therein engaging the pin 62 and leading cam edges 64 eccentric to the axis of the pin 52 and bearing on the rear face of the brake member 56. A manipulating handle 65 is affixed to and directed rearwardly from the cross web 63. When the handle 65 is in a depressed position, as illustrated by broken line in FIG. 3 of the drawing, the low section of the cam edge 64 registers with the brake member 56 to release the brake 54 and permit the free rotation of the wheel 47 about the axle 48 and the free swiveling of the bracket 39 about the vertical axis. Upon the raising of the handle 65 the raised section of the cam edge 64 engages the brake member 56 to lock the brake 54 in a braking position wherein the brake shoe 57 firmly engages the wheel 47 to prevent its rotation and the brake shoe 58 firmly engages the race member section so to prevent the swiveling of the bracket 39 and wheel 47. The wheel and bracket are released merely by depressing the handle 65.

In producing the caster device 11 according to the present improved method, the shank 21 initially lacks the head 36 and is of a greater length than that in the finished assembly by approximately the volume of the head 36. The collar 23 is placed in engagement with the shank 21 and in abutment with the upper shoulder thereon, and the bearing assembly 24 together with the associated bracket as earlier described, is then brought into registry with the shank 21 and in abutment with the collar 23. The shank 21 is heated to a forging temperature, preferably with a minimum of heating of the other components, and the lower end of the shank is upset forged to form the head 36 and effect a tight and rigid assembly. It should be noted that this tight assembly is augmented by the radial expansion of the shank 21 attendant to the forging pressure. Following the cooling of the above assembly the axle 48 and wheel 47 are attached to the bracket arms 46.

Specifically, the shank 21 is subjected to induction forging by the use of an electrical projection welder, one electrode of which engages the stem 20 and the other electrode of which has a cup-shaped face engaging and bearing upon the complementary end face of shank 21. A heavy electrical current is fed to the welder electrodes and they are simultaneously urged together under heavy pressure which is axially applied to the open end of shank 21. In commercial use, optimum results are obtained when the free end of shank 21 is brought to a temperature of between 1,000 and 1,300° F. The shank 21 reaches its forging temperature, by reason of the resistance heating thereof, very rapidly, and the head 36 is upset forged under heavy pressure of the projection welder. The flange 38 is formed and extends outwardly, being pressed against the under surface of the race section 32 by reason of the complementary shape of the head-forming pressure electrode.

It has been found that the shank 21 is provided with improved and unexpected structural characteristics when its head 36 is formed by induction forging rather than by the split riveting method previously employed. The forging method permits the shank 21 to be made of a very strong high carbon steel, whereas when the stem is riveted, the steel constituent material must be leaded so as to render it ductible. This in itself provides for greater structural strength in the assembled caster.

Further, it has been found that during the induction forging, the heat produced is not localized at the area of the head 36, but rather extends upwardly along the shank 21 and several inches along the stem 20. This heated area in indicated at C by the closely spaced hatch lines in FIG. 3. Thus, the head 36, shank 21, and lower portion of stem 20 become case hardened. The caster mounting is thus given rigidity at those very areas of structural weakness which cause breakage of conventional casters under heavy loads. Thus, in the usual riveted caster stems, the split head formed by riveting would tend to compress and pull back through its mounting aperture, or the stem tends to snap off along the shoulder formed with the integral shank. The case hardening, provided by the induction welding method of the instant invention, prevents such casting breakage in the critical areas.

It should be noted that most of the electrical heating is confined to the shank 21 by reason of its smaller cross section and hence greater resistance. While the adjacent section of the stem 20 is also raised in temperature, it is of an order which does not adversely affect the assembly procedure or end product. By way of example where the stem 20 has a diameter of about 1⅜ inches and the shank 21 a diameter of about ⅞ inch the use of a 400 kva. resistance welding apparatus for the press forging of the head 36 is highly satisfactory.

While there has been described and illustrated a preferred embodiment of the present invention it is apparent that numerous alterations, omissions and additions may be made without departing from the spirit and scope thereof.

What I claim is:

1. The method of producing a caster device comprising assembling a high carbon steel mounting member having an upper section and an integrally formed depending shank of smaller transverse cross-section than said upper section with a wheel bearing and support assembly having an opening engaging said shank, heating said shank to at least the forging and case hardening temperatures of said steel by passing an electric current therethrough, and applying axial pressure to the end face of said heated shank to deform and enlarge the bottom section thereof into a head which rigidly locks said wheel bearing and support assembly to said shank, whereby the member becomes case hardened throughout the area adjacent the junction of the upper section and the shank of smaller cross-section.

2. The method of claim 1 wherein said shank of smaller cross-sectional area is heated to said forging and case hardening temperatures substantially to the exclusion of said wheel bearing and support assembly.

3. The method of claim 1 wherein said shank of smaller cross-sectional area is radially expanded under said axial pressure.

References Cited by the Examiner
UNITED STATES PATENTS

| | | | |
|---|---|---|---|
| 1,753,431 | 4/1930 | Harold | 16—21 |
| 2,473,245 | 6/1949 | Hanna | 219—152 |
| 2,624,104 | 1/1953 | Finstead. | |
| 2,743,509 | 5/1956 | Friedman | 29—552.4 |
| 2,878,562 | 3/1959 | Bruce | 29—552.4 |
| 2,952,898 | 9/1960 | Glavan et al. | 29—148.4 |
| 2,998,617 | 9/1961 | Murphy | 16—21 |

WHITMORE A. WILTZ, *Primary Examiner.*

DONLEY J. STOCKING, THOMAS H. EAGER,
*Examiners.*